(12) United States Patent
Chen

(10) Patent No.: US 10,507,446 B2
(45) Date of Patent: *Dec. 17, 2019

(54) METHOD OF PREPARING A MATERIAL OF A BATTERY CELL

(71) Applicant: Liang-Yuh Chen, Saratoga, CA (US)

(72) Inventor: Liang-Yuh Chen, Saratoga, CA (US)

( * ) Notice: Subject to any disclaimer, the term of this patent is extended or adjusted under 35 U.S.C. 154(b) by 39 days.

This patent is subject to a terminal disclaimer.

(21) Appl. No.: 15/846,094

(22) Filed: Dec. 18, 2017

(65) Prior Publication Data

US 2018/0183036 A1 Jun. 28, 2018

Related U.S. Application Data

(63) Continuation of application No. 13/900,915, filed on May 23, 2013, now Pat. No. 10,076,737.

(Continued)

(51) Int. Cl.

| | |
|---|---|
| *B01J 8/18* | (2006.01) |
| *C01B 13/14* | (2006.01) |
| *C01B 13/34* | (2006.01) |
| *B22F 9/22* | (2006.01) |
| *C01G 1/02* | (2006.01) |
| *B22F 9/08* | (2006.01) |
| *B01J 8/24* | (2006.01) |
| *B01J 12/02* | (2006.01) |
| *C01B 25/45* | (2006.01) |
| *H01M 4/04* | (2006.01) |
| *H01M 4/36* | (2006.01) |
| *H01M 4/505* | (2010.01) |
| *H01M 4/525* | (2010.01) |

(52) U.S. Cl.
CPC ............ *B01J 8/18* (2013.01); *B01J 8/1827* (2013.01); *B01J 8/24* (2013.01); *B01J 12/02* (2013.01); *B22F 9/082* (2013.01); *B22F 9/22* (2013.01); *C01B 13/14* (2013.01); *C01B 13/34* (2013.01); *C01B 25/45* (2013.01); *C01G 1/02* (2013.01); *H01M 4/04* (2013.01); *H01M 4/0471* (2013.01); *H01M 4/36* (2013.01); *C01P 2006/40* (2013.01); *H01M 4/505* (2013.01); *H01M 4/525* (2013.01); *Y02P 20/129* (2015.11); *Y02P 20/145* (2015.11)

(58) Field of Classification Search
CPC ..................................................... C01B 25/45
See application file for complete search history.

(56) References Cited

U.S. PATENT DOCUMENTS

| | | | | | |
|---|---|---|---|---|---|
| 5,589,300 | A | * | 12/1996 | Fauteux | ............... C01G 31/00 423/599 |
| 10,076,737 | B2 | * | 9/2018 | Chen | ..................... C01B 13/14 |

* cited by examiner

*Primary Examiner* — Peter F Godenschwager
(74) *Attorney, Agent, or Firm* — Ya-Fen Chan

(57) ABSTRACT

A continuous process for producing a material of a battery cell using a system having a mist generator, a drying chamber, one or more gas-solid separators and a reactor is provided. A mist generated from a liquid mixture of two or more metal precursor compounds in desired ratio is dried inside the drying chamber. Heated air or gas is served as the gas source for forming various gas-solid mixtures and as the energy source for reactions inside the drying chamber and the reactor. One or more gas-solid separators are used in the system to separate gas-solid mixtures from the drying chamber into solid particles mixed with the metal precursor compounds and continuously deliver the solid particles into the reactor for further reaction to obtain final solid material particles with desired crystal structure, particle size, and morphology.

20 Claims, 6 Drawing Sheets

Related U.S. Application Data

(60) Provisional application No. 61/855,063, filed on May 6, 2013.

METHOD OF PREPARING A MATERIAL OF A BATTERY CELL

CROSS-REFERENCE TO RELATED APPLICATIONS

This application is, a continuation application of co-pending U.S. patent application Ser. No. 13/900,915, filed May 23, 2013, which claims benefit of an U.S. provisional patent application Ser. No. 61/855,063, filed May 6, 2013. The disclosures of all of these patent applications are herein incorporated by reference.

FIELD OF THE INVENTION

This invention generally relate to the preparation of materials for battery applications. More specifically, the invention related to method and system in manufacturing structured cathode or anode active materials for use in secondary batteries.

BACKGROUND OF THE INVENTION

Great efforts have been devoted to the development of advanced electrochemical battery cells to meet the growing demand of various consumer electronics, electrical vehicles and grid energy storage applications in terms of high energy density, high power performance, high capacity, long cycle life, low cost and excellent safety. In most cases, it is desirable for a battery to be miniaturized, light-weighted and rechargeable (thus reusable) to save space and material resources.

In an electrochemically active battery cell, a cathode and an anode are immersed in an electrolyte and electronically separated by a separator. The separator is typically made of porous polymer membrane materials such that metal ions released from the electrodes into the electrolyte can diffuse through the pores of the separator and migrate between the cathode and the anode during battery charge and discharge. The type of a battery cell is usually named from the metal ions that are transported between its, cathode and anode electrodes. Various rechargeable secondary batteries, such as nickel cadmium battery, nickel-metal hydride battery, lead acid battery, lithium ion battery, and lithium ion polymer battery, etc., have been developed commercially over the years. To be used commercially, a rechargeable secondary battery is required to be of high energy density, high power density and safe. However, there is a trade-off between energy density and power density.

Lithium ion battery is a secondary battery which was developed in the early 1990s. As compared to other secondary batteries, it has the advantages of high energy density, long cycle life, no memory effect, low self-discharge rate and environmentally benign. Lithium ion battery rapidly gained acceptance and dominated the commercial secondary battery market. However, the cost for commercially manufacturing various lithium battery materials is considerably higher than other types of secondary batteries.

In a lithium ion battery, the electrolyte mainly consists of lithium salts (e.g., LiPF6, LiBF4 or LiClO4) in an organic solvent (e.g., ethylene carbonate, dimethyl carbonate, and diethyl carbonate) such that lithium ions can move freely therein. In general, aluminum foil (e.g., 15~20 µm in thickness) and copper foil (e.g., 8~15 µm in thickness) are used as the current collectors of the cathode electrode and the anode electrode, respectively. For the anode, micron-sized graphite (having a reversible capacity around 330 mAh/g) is often used as the active material coated on the anode current collector. Graphite materials are often prepared from solid-state processes, such as grinding and pyrolysis at extreme high temperature without oxygen (e.g., graphitization at around 3000° C.). As for the active cathode materials, various solid materials of different crystal structures and capacities have been developed over the years. Examples of good cathode active materials include nanometer- or micron-sized lithium transition metal oxide materials and lithium ion phosphate, etc.

Cathode active materials are the most expensive component in a lithium ion battery and, to a relatively large extent, determines the energy density, cycle life, manufacturing cost and safety of a lithium battery cell. When lithium battery was first commercialized, lithium cobalt oxide ($LiCoO_2$) material is used as the cathode material and it still holds a significant market share in the cathode active material market. However, cobalt is toxic and expensive. Other lithium transition metal oxide materials, such as layered structured $LiMeO_2$ (where the metal Me=Ni, Mn, Co, etc.; e.g., $LiNi_{0.33}Mn_{0.33}Co_{0.33}O_2$, with their reversible/practical capacity at around 140~150 mAh/g), spinel structured $LiMn_2O_4$ (with reversible/practical capacity at around 110~120 mAh/g), and olivine-type lithium metal phosphates (e.g., $LiFePO_4$, with reversible/practical capacity at around 140~150 mAh/g) have recently been developed as active cathode materials. When used as cathode materials, the spinel structured $LiMn_2O_4$ materials exhibit poor battery cycle life and the olivine-type $LiFePO_4$ materials suffer from low energy density and poor low temperature performance. As for $LiMeO_2$ materials, even though their electrochemical performance is better, prior manufacturing processes for $LiMeO_2$ can obtain mostly agglomerates, such that the electrode density for most $LiMeO_2$ materials is lower as compared to $LiCoO_2$. In any case, prior processes for manufacturing materials for battery applications, especially cathode active materials, are too costly as most processes consumes too much time and energy, and still the qualities of prior materials are inconsistent and manufacturing yields are low.

Conventional material manufacturing processes such as solid-state reaction (e.g., mixing solid precursors and then calcination) and wet-chemistry, processes (e.g., treating precursors in solution through co-precipitation, sol-gel, or hydrothermal reaction, etc., and then mixing and calcination) have notable challenges in generating nano- and micron-structured materials. It is difficult to consistently produce uniform solid materials (i.e., particles and powders) at desired particle sizes, morphology, crystal structures, particle shape, and even stoichiometry. Most conventional solid-state reactions require long calcination time (e.g., 4-20 hours) and additional annealing process for complete reaction, homogeneity, and grain growth. For example, spinel structured $LiMn_2O_4$ and olivine-type $LiFePO_4$ materials manufactured by solid-state reactions require at least several hours of calcination, plus a separate post-heating annealing process (e.g., for 24 hours), and still showing poor quality consistency. One intrinsic problem with solid-state reaction is the presence of temperature and chemical (such as $O_2$) gradients inside a calcination furnace, which limits the performance, consistency and overall quality of the final products.

On the other hand, wet chemistry processes performed at low temperature usually involve faster chemical reactions, but a separate high temperature calcination process and even additional annealing process are still required afterward. In addition, chemical additives, gelation agents, and surfactants required in a wet chemistry process will add to the material manufacturing cost (in buying additional chemicals and adjusting specific process sequence, rate, pH, and temperature) and may interfere with the final composition of the as-produced active materials (thus often requiring additional steps in removing unwanted chemicals or filtering products). Moreover, the sizes of the primary particles of the product powders produced by wet chemistry are very small, and tends to agglomerates into undesirable large sized secondary particles, thus affecting energy packing density. Also, the morphologies of the as-produced powder particles often exhibit undesirable amorphous aggregates, porous agglomerates, wires, rods, flakes, etc. Uniform particle sizes and shapes allowing for high packing density are desirable.

The synthesis of lithium cobalt oxide ($LiCoO_2$) materials is relatively simple and includes mixing a lithium salt (e.g., lithium hydroxide (LiOH) or lithium carbonate ($Li_2CO_3$)) with cobalt oxide ($Co_3O_4$) of desired particle size and then calcination in a furnace at a very high temperature for a long time (e.g., 20 hours at 900° C.) to make sure that lithium metal is diffused into the crystal structure of cobalt oxide to form proper final product of layered crystal structured $LiCoO_2$ powders. This approach does not work for $LiMeO_2$ since transition metals like Ni, Mn, and Co does not diffuse well into, each other to form uniformly mixed transition metal layers if directly mixing and reacting (solid-state calcination) their transition metal oxides or salts. Therefore, conventional $LiMeO_2$ manufacturing processes requires buying or preparing transitional metal hydroxide precursor compounds (e.g., $Me(OH)_2$, Me=Ni, Mn, Co, etc.) from a co-precipitation wet chemistry process prior to making final active cathode materials (e.g., lithium NiMnCo transitional metal oxide ($LiMeO_2$)).

Since the water solubility of these $Ni(OH)_2$, $Co(OH)_2$, and $Mn(OH)_2$ precursor compounds are different and they normally precipitate at different concentrations, the pH of a mixed solution of these precursor compounds has to be controlled and ammonia ($NH_3$) or other additives has to be added slowly and in small aliquots to make sure nickel (Ni), manganese (Mn), and cobalt (Co) can co-precipitate together to form micron-sized nickel-manganese-cobalt hydroxide ($NMC(OH)_2$) secondary particles. Such co-precipitated $NMC(OH)_2$ secondary particles are often agglomerates of nanometer-sized primary particles. Therefore, the final lithium NMC transitional metal oxide ($LiMeO_2$) made from $NMC(OH)_2$ precursor compounds are also agglomerates. These agglomerates are prone to break under high pressure during electrode calendaring step and being coated onto a current collector foil. Thus, when these lithium NMC transitional metal oxide materials are used as cathode active materials, relatively low pressure has to be used in calendaring step, and further limiting the electrode density of a manufactured cathode.

In conventional manufacturing process for $LiMeO_2$ active cathode materials, precursor compounds such as lithium hydroxide (LiOH) and transitional metal hydroxide ($Me(OH)_2$ are mixed uniformly in solid-states and stored in thick $Al_2O_3$ crucibles. Then, the crucibles are placed in a heated furnace with 5-10° C./min temperature ramp up speed until reaching 900° to 950° C. and calcinated for 10 to 20 hours. Since the precursor compounds are heated under high temperature for a long time, the neighboring particles are sintered together, and therefore, a pulverization step is often required after calcination. Thus, particles of unwanted sizes have to be screened out after pulverization, further lowering down the overall yield. The high temperature and long reaction time also lead to vaporization of lithium metals, and typically requiring as great as 10% extra amount of lithium precursor compound being added during calcination to make sure the final product has the correct lithium/transition metal ratio. Overall, the process time for such a multi-step batch manufacturing process will take up to a week so it is very labor intensive and energy consuming. Batch process also increases the chance of introducing impurity with poor run-to-run quality consistency and low overall yield.

Thus, there is a need for an improved process and system to manufacture high quality, structured active materials for a battery cell.

SUMMARY OF THE INVENTION

This invention generally relate to preparing materials for battery applications. More specifically, the invention related to method and system for producing material particles (e.g., active electrode materials, etc) in desirable crystal structures, sizes and morphologies.

In one embodiment, a method of producing a material (e.g., cathode or anode active materials) for a battery electrochemical cell is provided. The method includes forming a liquid mixture from two or more precursors, flowing a first flow of a first gas that is heated to a first temperature into a drying, chamber, and generating a mist of the liquid mixture at desired liquid droplet sizes inside the drying chamber, drying the mist of the liquid mixture for a first residence time inside the drying chamber, and forming a first gas-solid mixture inside the drying chamber from the heated first gas and the mist. The method further includes delivering the first gas-solid mixture out of the drying chamber, separating the first gas-solid mixture into a first type of solid particles and a waste product, delivering the first type of solid particles into a reactor, flowing a second flow of a second gas that is heated to a second temperature inside the reactor, forming a second gas-solid mixture inside the reactor from the heated second gas and the first type of solid particles, reacting the second gas-solid mixture inside the reactor for a second residence time, oxidizing the second gas-solid mixture into an oxidized reaction product, and delivering the oxidized reaction product out of the reactor. Then, the oxidized reaction product is cooled to obtain a second type of solid particles.

In one aspect, the second type of solid particles is suitable as an active electrode material to be further processed into an electrode of a battery cell. In another aspect, the oxidized reaction product is further separated into the second type of solid particles and a gaseous side product. In still another aspect, one or more flows of a cooling fluid (e.g., gas or liquid) can be used to cool the temperature of the second type of solid particles.

In another embodiment, a method is provided to prepare a material for a battery electrochemical cell, and includes delivering a liquid mixture into a process system. The process system includes a drying chamber, a mist generator, one or more gas-solid separators; and a reactor. The method further includes flowing a first flow of a first gas into the drying chamber of the process system, generating a mist of desired liquid droplet sizes from the liquid mixture inside the drying chamber using the mist generator, drying the mist of the liquid mixture for a first residence time inside the drying chamber, forming a first gas-solid mixture inside the drying chamber from the first gas and the mist, and separating a chamber product from the drying chamber into a first type of solid particles and a waste product using the first gas-solid separator of the process system. Next, the first type of solid particles is delivered into the reactor of the process system, a second flow of a second gas heated to a reaction temperature is flown inside the reactor, and a second gas-solid mixture is formed inside the reactor from the heated second gas and the first type of solid particles. The method further includes reacting the second gas-solid mixture inside the reactor for a second residence time, oxidizing the second gas-solid mixture into an oxidized reaction product, and delivering the oxidized reaction product out of the reactor. In addition the oxidized reaction product is separated into a second type of solid particles and a gaseous side product using a second gas-solid separator of the process system.

In still another embodiment, a method is provided to produce an electrode, material and includes forming a liquid mixture from two or more metal-containing precursors, flowing a first flow of a first gas into a drying chamber, generating a mist of the liquid mixture inside the drying chamber, drying the mist far a first residence time inside, the drying chamber, forming a first gas-solid mixture inside the drying chamber, separating the first gas-solid mixture into a first type of solid particles and a waste product, and delivering the first type of solid particles into a reactor. Then, a second flow of a second gas heated to a reaction temperature is flown inside the reactor to form a second gas-solid mixture with the first type of solid particles. The second gas-solid mixture is reacted for a second residence time into an oxidized reaction product inside the reactor. The oxidized reaction product is then separated into a second type of solid particles and a gaseous side product, and the second type of solid particles is cooled down to room temperature and obtained as the material for the battery cell.

In yet another embodiment, a process system for manufacturing a material of a battery cell is provided. The system includes a mist generator adapted to generate a mist from a liquid mixture, a drying chamber having a chamber inlet and a chamber outlet, and a first gas line connected to the drying chamber and adapted to, flow a first gas into the drying chamber and form a first gas-solid mixture inside the drying chamber. The system further includes a first gas-solid separator and a reactor. The first gas-solid separator is adapted to collect chamber products from the drying chamber and separate the chamber products into a first type of solid particles and waste products.

The first gas-solid separator includes a separator inlet connected to the chamber outlet and adapted to collect the chamber products from the drying chamber, a first separator outlet adapted to deliver the first type of solid particles, and a second separator outlet adapted to deliver waste products out of the first gas-solid separator. The reactor includes a reactor inlet connected to the first separator outlet and adapted to receive the first type of solid particles, a gas inlet connected to a second gas line to flow a second gas and form a second gas-solid mixture inside the reactor, and a reactor outlet. A second type of solid particles is obtained from a reaction of the second gas-solid mixture within the using energy from the second gas that is heated to a reaction temperature.

In one aspect, the system uses heated gas pre-heated to a reaction temperature and flown from the second gas line into the reactor as energy source for reacting the second gas-solid mixture into an oxidized reaction product within the reactor. In another aspect, the system provides a second gas-solid separator connected to the reactor outlet to collect the oxidized reaction product and separate the oxidized reaction product into second type of solid particles and gaseous side products. In still another aspect, one or more cooling fluid lines are provided and adapted to cool the second type of solid particles.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention generally provides a process system for preparing a material of a battery cell. The process system includes a mist generator, a drying chamber, one or more gas-solid separators and a reactor. The process system is useful in performing a continuous process to manufacture a material for a battery cell, save material manufacturing time and energy, and solve the problems of high manufacturing cost, low yield, poor quality consistency, low electrode density, low energy density as seen in conventional active material manufacturing processes.

In one aspect, precursor compounds, such as metal-containing precursors are mixed into a liquid mixture such that the ratio of different metal precursors can be adjustable in desirable ratio and still able to obtain uniform blending of the precursors. The liquid mixture is then promptly dried into evenly mixed solid particles, which are continuously delivered into a rector to mix with a gas to form a gas-solid mixture and be reacted in gas phase.

In another aspect, heated air or gas is served as the gas source for forming various gas-solid mixtures and as the energy source for reactions inside the drying chamber and the reactor. In still another aspect, the gas-solid mixtures formed inside the drying chamber and/or the reactor are further separated into solid particles. In one embodiment, one or more gas-solid separators are used in the process system to separate gas-solid mixtures inside the drying chamber into solid particles, which contain a uniform mixture of metal precursor compounds in desired ratio, and continuously deliver the mixed solid particles into the reactor for further reaction. Further, unwanted waste products and reaction side products are separated and removed during the continuous material manufacturing process to ensure the quality of final product particles.

Reaction products from the reactor are delivered out of the reactor and cooled down. After cooling, the reaction products contain solid material particles or fine powers of an oxidized form of the precursor composition (e.g., a metal oxide material, such as fine powers of a mixed metal oxide material), with desired crystal structure, particle size, and morphology. Accordingly, high quality and consistent active battery materials can be obtained with much less time, labor, and supervision than materials prepared from conventional manufacturing processes.

Figure 1:
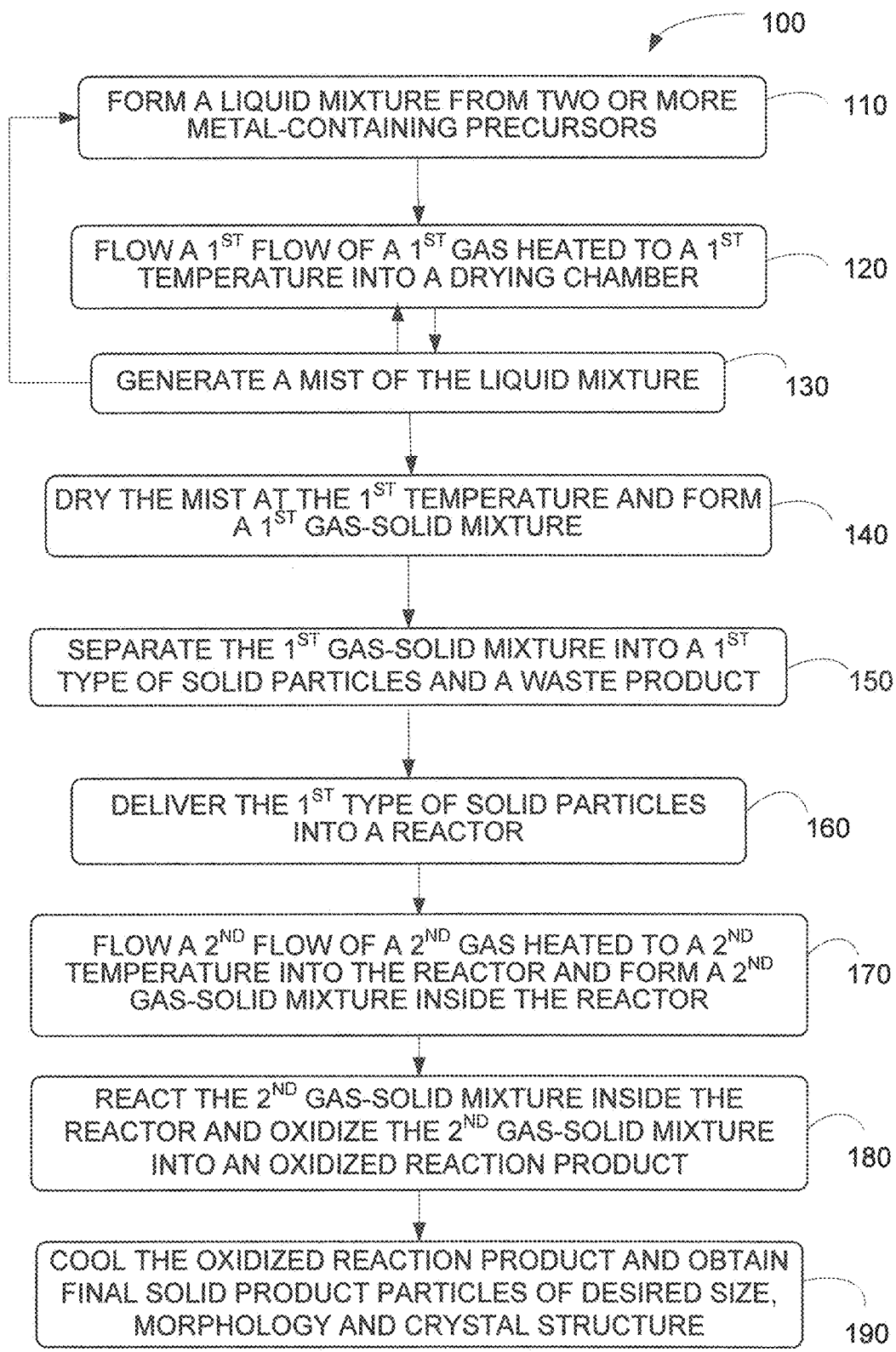
FIG. 1 illustrates one embodiment of a flow chart of a method of producing a material for a battery electrochemical cell.

FIG. 1 illustrates a method 100 of producing a material useful in a battery electrochemical cell. Firstly, at step 110 of the method 100, a liquid mixture is formed from two or more precursors. In general, liquid form of a precursor compound can be prepared directly into a liquid mixture in a desired concentration. Solid form of a precursor compound can be dissolved or dispersed in a suitable solvent (e.g., water, alcohol, isopropanol, or any other organic or inorganic solvents, and their combinations) to form into a liquid mixture of an aqueous solution, slurry, gel, aerosol or any other suitable liquid forms. For example, desirable molar ratio of two or more solid precursors can be prepared into a liquid mixture, such as by measuring and preparing appropriate amounts of the two or more solid precursors into a container with suitable amounts of a solvent. Depending on the solubility of the precursors in the solvent, pH, temperature, and mechanical stirring and mixing can be adjusted to obtain a liquid mixture where the precursor compounds are fully dissolved and/or evenly dispersed.

In one example, two or more metal-containing precursors are mixed into a liquid mixture for obtaining a final reaction product of a mixed metal oxide material. Exemplary metal-containing precursors include, but are not limited to, metal salts, lithium-containing compound, cobalt-containing compound, manganese-containing compound, nickel-containing compound, lithium sulfate ($Li_2SO_4$), lithium nitrate ($LiNO_3$), lithium carbonate ($Li_2CO_3$), lithium acetate ($LiCH_2COO$), lithium hydroxide (LiOH), lithium formate ($LiCHO_2$), lithium chloride (LiCl), cobalt sulfate ($CoSO_4$), cobalt nitrate ($Co(NO_3)_2$), cobalt carbonate ($CoCO_3$), cobalt acetate ($Co(CH_2COO)_2$), cobalt hydroxide ($Co(OH)_2$), cobalt formate ($Co(CHO_2)_2$), cobalt chloride ($CoCl_2$), manganese sulfate ($MnSO_4$), manganese nitrate ($Mn(NO_3)_2$), manganese carbonate ($MnCO_3$), manganese acetate ($Mn(CH_2COO)_2$), manganese hydroxide ($Mn(OH)_2$), manganese formate ($Mn(CHO_2)_2$), manganese chloride ($MnCl_2$), nickel sulfate ($NiSO_4$), nickel nitrate ($Ni(NO_3)_2$), nickel carbonate ($NiCO_3$), nickel acetate ($Ni(CH_2COO)_2$), nickel hydroxide ($Ni(OH)_2$), nickel formate ($Ni(CHO_2)_2$), nickel chloride ($NiCl_2$), aluminum (Al)-containing compound, titanium (Ti)-containing compound, sodium (Na)-containing compound, potassium (K)-containing compound, rubidium (Rb)-containing compound, vanadium (V)-containing compound, cesium (Cs)-containing compound, chromium (Cr)-containing compound, copper (Cu)-containing compound, magnesium (Mg)-containing compound, iron (Fe)-containing compound, and combinations thereof, among others.

Not wishing to be bound by theory, it is contemplated that, in order to prepare an oxide material with two or more different metals, all of the required metal elements are first mixed into a liquid mixture (e.g., into a solution, a slurry, or a gel mixture) using two or more metal-containing precursor compounds as the sources of each metal element such that the two or more different metals can be mixed uniformly at desired ratio. As an example, to prepare a liquid mixture of an aqueous solution, slurry, or gel, one or more metal salts with high water solubility can be used. For example, metal nitrate, metal sulfate, metal chloride, metal acetate, metal formate can be used. Organic solvents, such as alcohols, isopropanol, etc., can be used to dissolve or disperse metal-containing precursors with low water solubility. In some cases, the pH value of the liquid mixture can be adjusted to increase the solubility of the one or more precursor compounds. Optionally, chemical additives, gelation agents, and surfactants, such as ammonia, EDTA, etc., can be added into the liquid mixture to help dissolve or disperse the precursor compounds in a chosen solvent.

At step 120, a first flow of a first gas is flown into a drying chamber. At step 130, a mist of the liquid mixture is generated inside the drying chamber. The mist may be generated by a mist generator, such as a nozzle, a sprayer, an atomizer, or any other mist generators. Most mist generators employ air pressure or other means to covert a liquid solution, a slurry, or a gel mixture into liquid droplets. The mist generator can be coupled to a portion of the drying chamber to generate a mist (e.g., a large collection of small size droplets) of the liquid mixture directly within the drying chamber. As an example, an atomizer can be attached to a portion of the drying chamber to spray or inject the liquid mixture into a mist containing small sized droplets directly inside the drying chamber. In general, a mist generator that generates a mist of mono-sized droplets is desirable. Alternatively, a mist can be generated outside the drying chamber and delivered into the drying chamber.

Desired liquid droplet sizes can be adjusted by adjusting the sizes of liquid delivery/injection channels within the mist generator. Droplet size ranging from a few nanometers to a few hundreds of micrometers can be generated. Suitable droplet sizes can be adjusted according to the choice of the mist generator used, the precursor compounds, the temperature of the drying chamber, the flow rate of the first gas, and the residence time inside the drying chamber. As an example, a mist with liquid droplet sizes between one tenth of a micron and one millimeter is generated inside the drying chamber.

Not wishing to be bound by theory, in the method 100 of manufacturing a battery material using two or more precursor compounds, it is contemplated that the two or more precursor compounds are prepared into a liquid mixture and then converted into droplets, each droplet will have the two or more precursors uniformly distributed together. Then, the moisture of the liquid mixture is removed by passing the droplets through the drying chamber and the flow of the first gas is used to carry the mist within the drying chamber for a suitable residence time. It is further contemplated that the concentrations of the precursor compounds in a liquid mixture and the droplet sizes of the mist of the liquid mixture can be adjusted to control the chemical composition, particle sizes, and size distribution of final product particles of the battery material.

At step 140, the mist of the liquid mixture is dried within the drying chamber for a desired first residence time to remove its moisture. As the removal of the moisture from the mist of the precursor compounds is performed within the drying chamber filled with the first gas, a first gas-solid mixture composing of the heated first gas and the precursor compounds is formed. Accordingly, one embodiment of the invention provides that the first gas flown within the drying chamber is used as the gas source for forming a first gas-solid mixture within the drying chamber. In another embodiment, the first gas flown within the drying chamber is heated and the thermal energy of the heated first gas is served as the energy source for carrying out drying reaction and other reactions inside the drying chamber. The first gas can be heated to a temperature of between 70° C. to 600° C. by passing through a suitable heating mechanism, such as electricity powered heater, fuel-burning heater, etc.

In one configuration, the first gas is pre-heated prior to flowing into the drying chamber. Optionally, drying the mist can be carried out by heating the drying chamber directly, such as heating the chamber body of the drying chamber. The advantages of using heated gas are fast heat transfer, high temperature uniformity, and easy to scale up, among others. The drying chambers may be any chambers, furnaces with enclosed chamber body, such as a dome type ceramic drying_chamber, a quartz chamber, a tube chamber, etc. Optionally, the chamber body is made of thermal insulation materials (e.g., ceramics, etc.) to prevent heat loss during drying.

The first gas may be, for example, air, oxygen, carbon dioxide, nitrogen gas, hydrogen gas, inert gas, noble gas, and combinations thereof, among others. For example, heated air can be used as an inexpensive gas source and energy source for drying the mist. The choice of the first gas may be a gas that mix well with the mist of the precursors and dry the mist without reacting to the precursors. In some cases, the chemicals in the droplets/mist may react to the first gas and/or to each other to certain extent during drying, depending on the drying temperature and the chemical composition of the precursors. In addition, the residence time of the mist of thoroughly mixed precursor compounds within the drying chamber is adjustable and may be, for example, between one second and one hour, depending on the flow rate of the first gas, and the length of the path that the mist has to flow through within the drying chamber.

The mist of the liquid mixture is being dried within the drying chamber by flowing the heated first gas continuously and/or at adjustable, variable flow rates. At the same time, the dried solid particles of precursors are carried by the first gas, as a thoroughly-mixed gas-solid mixture, through a path within the drying chamber, and as more first gas is flown in, the gas-solid mixture is delivered out of the drying chamber and continuously delivered to a gas-solid separator connected to the drying chamber.

Next, at step 150, the gas-solid mixture comprising of the first gas and the precursors mixed together are separated into a first type of solid particles and a waste product using, for example, a gas-solid separator. The first type of solid particles may include thoroughly-mixed solid particles of the precursors.

At step 160, the first type of solid particles is delivered into a reactor to be reacted into reaction products. At step 170, a second flow of a second gas that is heated to a second temperature is flown inside the reactor. Accordingly, the heated second gas and the first type of solid particles delivered inside the reactor are mixed together to form a second gas-solid mixture. In one embodiment, the second gas is heated to a desired reaction temperature, such as a temperature of between 400° C. to 1300° C., and flown into the reactor to serve as the energy source for reacting the precursor-containing first type of solid particles.

At step 180, the second gas-solid mixture inside the reactor is reacted for a second residence time into a reaction product. The second residence time may be any residence time to carry out a complete reaction of the second gas solid mixture, such as a residence time of between one second and ten hours, or longer. Reactions of the second gas-solid mixture within the reactor may include any of oxidation, reduction, decomposition, combination reaction, phase-transformation, re-crystallization, single displacement reaction, double displacement reaction, combustion, isomerization, and combinations thereof. For example, the second gas-solid mixture may be oxidized, such as oxidizing the precursor compounds into an oxide material.

Exemplary second gas include, but are not limited to air, oxygen, carbon dioxide, an oxidizing gas, nitrogen gas, inert gas, noble gas, and combinations thereof. For an oxidation reaction inside the reactor, such as forming an oxide material from one or more precursors, an oxidizing gas can be used as the second gas. For reduction reactions inside the reactor, a reducing gas can be used as the second gas. As an example, heated air is used as the gas source for forming the second gas-solid mixture.

It is contemplated to obtain a second type of solid particles from a reaction of the second gas-solid mixture within the reactor using energy from the second gas that is heated to a reaction temperature to fully complete the reaction and obtain desired crystal structure of final reaction products. The advantages of flowing air or gas already heated are faster heat transfer, uniform temperature distribution (especially at high temperature range), and easy to scale up, among others.

At step 190, reaction products (e.g., a gas-solid mixture of oxidized reaction products mixed with second gas and/or other gas-phase by-products, or waste products, etc.) are delivered out of the reactor and cooled to obtain final solid particles of desired size, morphology, and crystal structure, ready to be further used for battery applications. For example, the reaction product may be slowly cooled down to room temperature to avoid interfering or destroying a process of forming into its stable energy state with uniform morphology and desired crystal structure.

Figure 2:
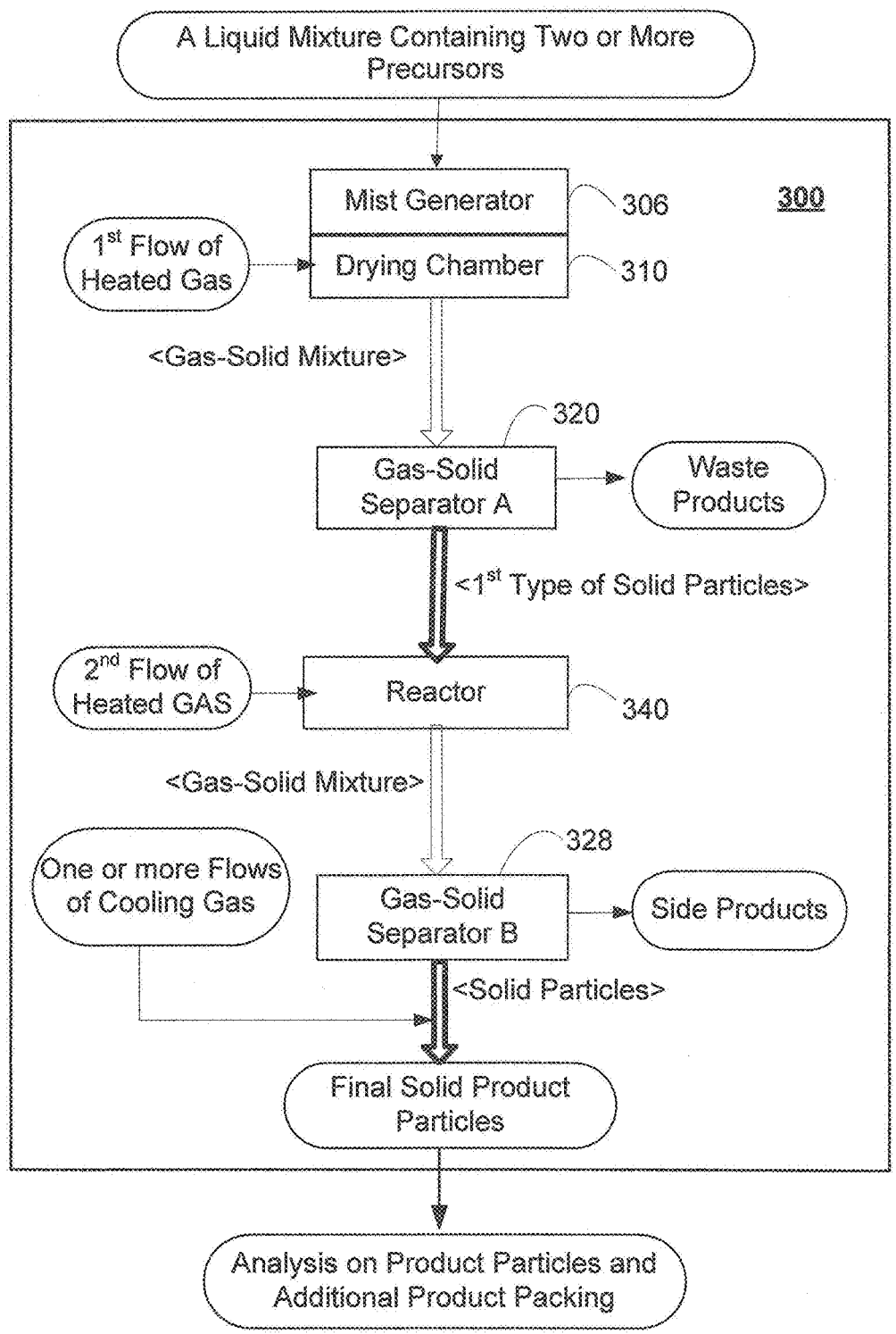
FIG. 2 illustrates a flow chart of various apparatuses that can be used to perform a process of preparing a battery material according one embodiment of the invention.

FIG. 2 illustrates a flow chart of incorporating the method 100 of preparing a material for a battery electrochemical cell using a system 300 fully equipped with all of the required manufacturing tools. The system 300 generally includes a mist generator 306, a drying chamber 310, a gas-solid separator 320, and a reactor 340. First, a liquid mixture containing two or more precursors is prepared and delivered into the mist generator 306 of the system 300. The mist generator 306 is coupled to the drying chamber 310 and adapted to generate a mist from the liquid mixture. A first flow of heated gas can be flown into the drying chamber 310 to fill and pre-heat an internal volume of the drying chamber 310 prior to the formation of the mist or at the same time when the mist is generated inside the drying chamber 310. The mist is mixed with the heated gas and its moisture is removed such that a gas-solid mixture, which contains the first heated gas, two or more precursors, and/or other gas-phase waste product or by-products, etc., is formed.

Next, the gas-solid mixture is continuously delivered into the gas-solid separator 320 which separates the gas-solid mixture into a first type of solid particles and waste products. The first type of solid particles is then delivered into the reactor 340 to be mixed with a second flow of heated gas and form a second gas-solid mixture. The reaction inside the reactor is carried out for a reaction time until reaction products can be obtained. Optionally, the reaction product gas-solid mixture can be delivered into a second gas-solid separator (e.g., a gas-solid separator 328) to separate and obtain final solid product particles and a gaseous side product. In addition, one or more flows of cooling fluids (e.g., gases or liquids) may be used to cool the temperature of the reaction products. The final solid product particles can be delivered out of the system 300 for further analysis on their properties (e.g., specific capacity, power performance, battery charging cyde performance, etc.), particle sizes, morphology, crystal structure, etc., to be used as a material in a_battery cell. Finally, the final particles are packed into a component of a battery cell.

Figure 3:
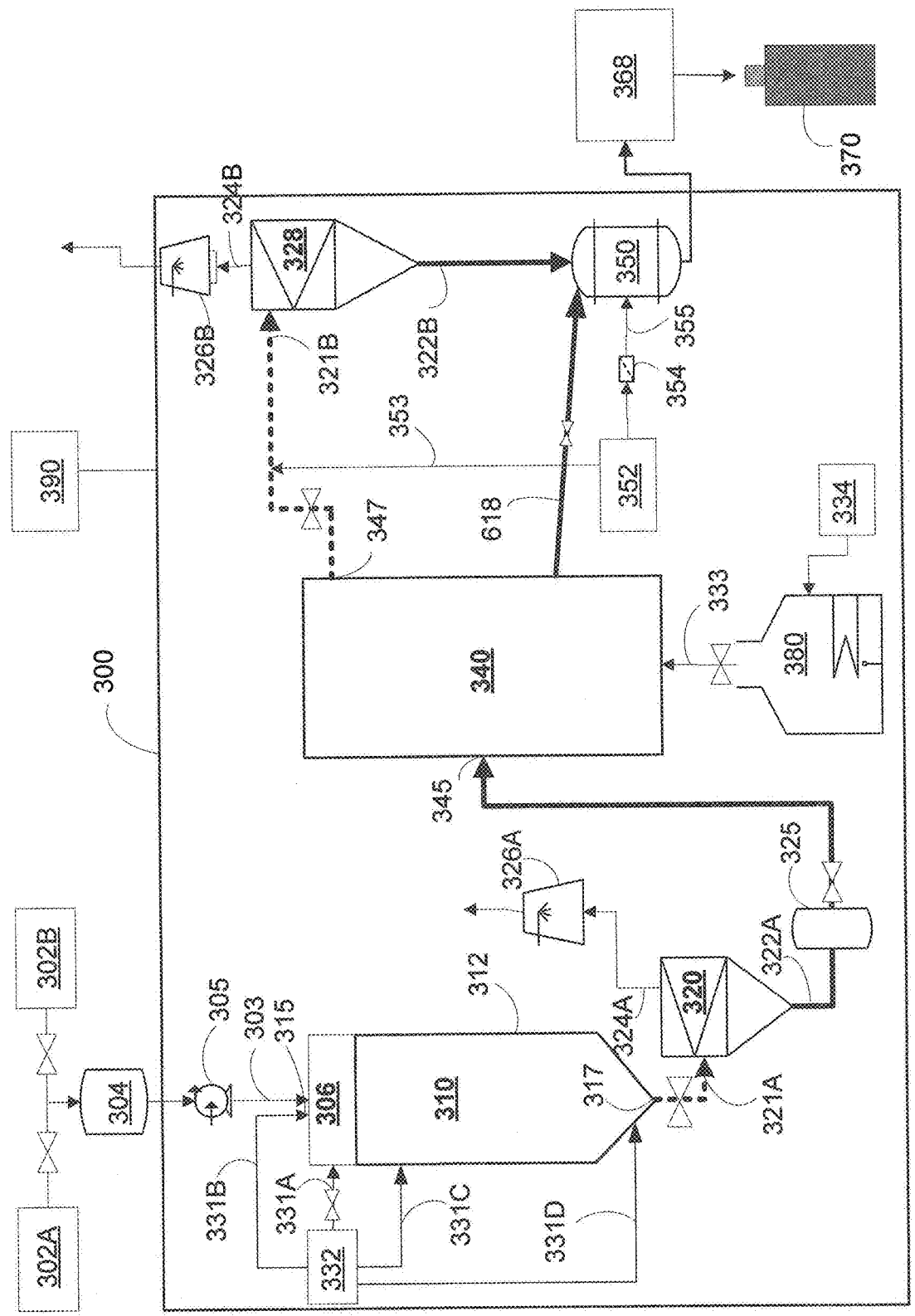
FIG. 3 is a schematic of a process system useful in preparing a material for a battery electrochemical cell according another embodiment of the invention.

FIG. 3 is a schematic of the system 300, which is one example of an integrated tool/apparatus that can be used to carry out a fast, simple, continuous and low cost manufacturing process for preparing a material for a battery electrochemical cell. The system 300 is connected to a liquid mixer 304, which in turn is connected to two or more reactant sources 302A, 302B. The reactant sources 302A, 302B are provided to store various precursor compounds and liquid solvents. Desired amounts of precursor compounds (in solid or liquid form) and solvents are dosed and delivered from the reactant sources 302A, 302B to the liquid mixer 304 so that the precursor compounds can be dissolved and/or dispersed in the solvent and mix well into a liquid mixture. If necessary, the liquid mixer 304 is heated to a temperature, such as between 30° C. and 90° C. to help uniformly dissolve, disperse, and/or mix the precursors. The liquid mixer 304 is optionally connected to a pump 305, which pumps the liquid mixture from the liquid mixer 304 into the mist generator 306 of the system 300 to generate a mist.

The mist generator 306 converts the liquid mixture into a mist with desired droplet size and size distribution. In addition, the mist generator 306 is coupled to the drying chamber 310 in order to dry and remove moisture from the mist and obtain thoroughly-mixed solid precursor particles. In one embodiment, the mist generator 306 is positioned near the top of the drying chamber 310 that is positioned vertically (e.g., a dome-type drying chamber, etc.) to inject the mist into the drying chamber 310 and pass through the drying chamber vertically downward. Alternatively, the mist generator can be positioned near the bottom of the drying chamber 310 that is vertically positioned to inject the mist upward into the drying chamber to increase the residence time of the mist generated therein. In another embodiment, when the drying chamber 310 is positioned horizontally (e.g., a tube drying chamber, etc.) and the mist generator 306 is positioned near one end of the drying chamber 310 such that a flow of the mist, being delivered from the one end through another end of the drying chamber 310, can pass through a path within the drying chamber 310 for the length of its residence time.

The drying chamber 310 generally includes a chamber inlet 315, a chamber body 312, and a chamber outlet 317. In one configuration, the mist generator 306 is positioned inside the drying chamber 310 near the chamber inlet 315 and connected to a liquid line 303 adapted to flow the liquid mixture therein from the liquid mixer 304. For example, the liquid mixture within the liquid mixer 304 can be pumped by the pump 305 through the liquid line 303 connected to the chamber inlet 315 into the internal volume of the drying chamber 310. Pumping of the liquid mixture by the pump 305 can be configured, for example, continuously at a desired delivery rate (e.g., adjusted by a metered valve or other means) to achieve good process throughput of system 300. In another configuration, the mist generator 306 is positioned outside the drying chamber 310 and the mist generated therefrom is delivered to the drying chamber 310 via the chamber inlet 315.

One or more gas lines (e.g., first gas lines 331A, 331B, 331C, 331D, etc.) can be coupled to various portions of the drying chamber 310 and adapted to flow a first gas from a gas source 332 into the drying chamber 310. A flow of the first gas stored in the gas source 332 can be delivered, concurrently with the formation of the mist inside drying chamber 310, into the drying chamber 310 to carry the mist through the drying chamber 310, remove moisture from the mist, and form a gas-solid mixture containing the precursors. Also, the flow of the first gas can be delivered into the drying chamber 310 prior to the formation of the mist to fill and preheat an internal volume of the drying chamber 310 prior to generating the mist inside the drying chamber 310.

In one example, the first gas line 331A is connected to the top portion of the drying chamber 310 to deliver the first gas into the mist generator 306 positioned near the chamber inlet 315 to be mixed with the mist generated by the mist generator 306 inside the drying chamber 310. In one embodiment, the first gas is preheated to a temperature of between 70° C. and 600° C. to mix with and remove moisture from the mist.

As another example, the first gas line 331B delivering the first gas therein is connected to the chamber inlet 315 of the drying chamber 310, in close proximity with the liquid line 303 having the liquid mixture therein. Accordingly, the first gas can thoroughly mix with the mist of the liquid mixture inside the drying chamber 310.

In another example, the first gas line 331C is connected to the chamber body 312 of the drying chamber 310 to deliver the first gas therein and mix the first gas with the mist generated from the mist generator 306. In addition, the first gas line 331D connected to the drying chamber 310 near the chamber outlet 317 may be used to ensure the gas-solid mixture formed within the drying chamber 310 is uniformly mixed with the first gas.

The flow of the first gas may be pumped through an air filter to remove any particles, droplets, or contaminants, and the flow rate of the first gas can be adjusted by a valve or other means. In one embodiment, the first gas is heated to a drying temperature to mix with the mist and remove moisture from the mist. It is designed to obtain spherical solid particles from a thoroughly-mixed liquid mixture of two or more precursors after drying the mist of the liquid mixture. In contrast, conventional solid-state manufacturing processes involve mixing or milling a solid mixture of precursor compounds, resulting in uneven mixing of precursors.

FIGS. 4A-4F show examples of the drying chamber 310 configured in the system 300 of FIG. 3 according to various embodiments of the invention. Inside the drying chamber 310, there are at least a mist flow 402 and at least a first gas flow 404 flowing and passing through therein. In one embodiment, the flows of the mist of the liquid mixture (e.g., the mist flow 402) and the flows of the first gas (e.g., the first gas flow 404) may encounter with each other inside the drying chamber at an angle of 0 degree to 180 degrees. In addition, the air streams of the mist flow 402 and the first gas flow 404 may be flown in straight lines, spiral, intertwined, and/or in other manners.

For example, the flow of the first gas and the flow of the mist flowing inside the drying chamber can be configured to flow as co-currents, as shown in the examples of FIGS. 4A-4C and 4F. Advantages of co-current flows are shorter residence time, lower particle drying temperature, and higher particle separation efficiency, among others. As another example, the flow of the first gas and the flow of the mist flowing inside the drying chamber can be configured to flow as counter currents, as shown in the examples of FIG. 4D-4E. Advantage of counter currents are longer residence time and higher particle drying temperature, among others In the example of FIG. 4A, the mist flow 402 and the first gas flow 404 are configured at an angle of zero (0) degree and can merge into a mixed flow (e.g., co-currents) inside the drying chamber. The first gas flow 404 is flown into a portion of the drying chamber near where the mist flow 402, such that the first gas is in close proximity with the mist to heat and dry the mist.

Figure 4A:
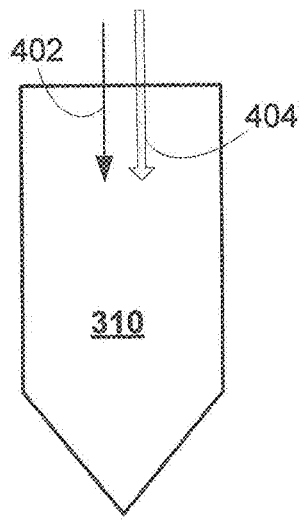
FIGS. 4A-4F show schematics of exemplary drying chambers configured in the process system of FIG. 3 according to various embodiments of the invention.
Figure 4B:
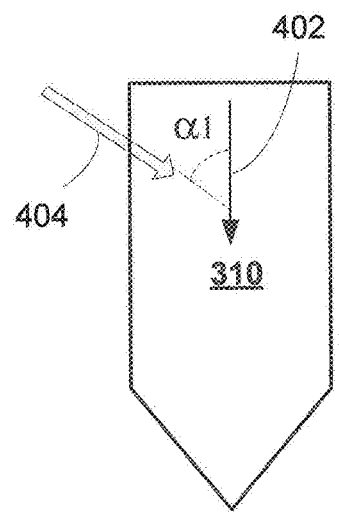
Figure 4C:
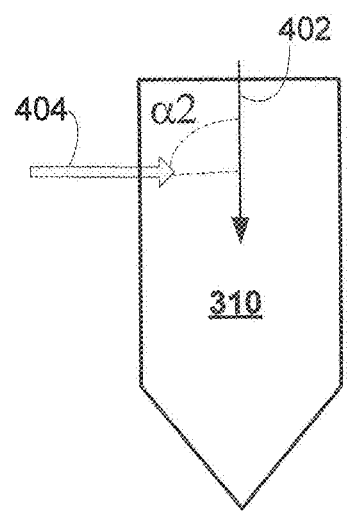
Figure 4D:
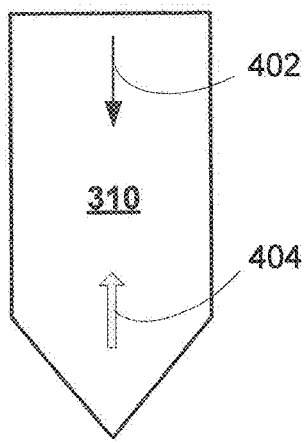
Figure 4E:
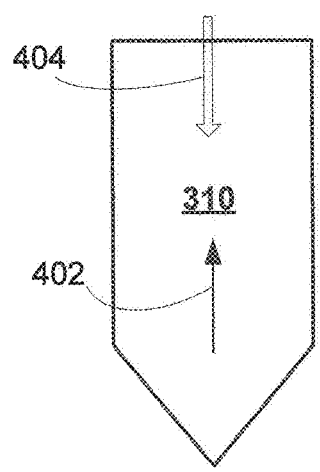

In the example of FIG. 4B, the mist flow 402 and the first gas flow 404 are configured at an a angle of less than 90 degree and can merge into a mixed flow inside the drying chamber. In the example of FIG. 4C, the mist flow 402 and the first gas flow 404 are configured at an a angle of 90 degree and can merge into a mixed flow inside the drying chamber. In addition, the mist flow 402 and the first gas flow 404 may be flown at various angles directed to each other and/or to the perimeter of the chamber body to promote the formation of spiral, intertwined, and/or other air streams inside the drying chamber 310.

In the example of FIG. 4D, the mist flow 402 and the first gas flow 404 are configured at an a angle of 180 degree and are flown as counter currents. FIG. 4E illustrates one example of the mist generator 306 positioned at the bottom of the drying chamber 310 such that the mist flow 402 and the first gas flow 404 can be configured at an a angle of 180 degree and are flown as counter currents.

Figure 4F:
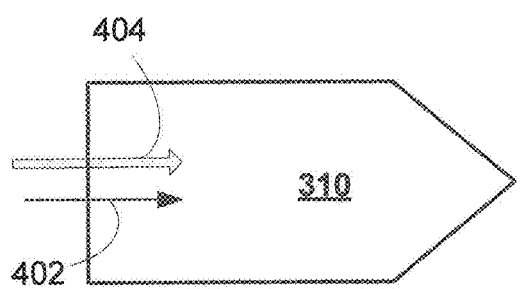

In an alternative embodiment, the drying chamber 310 can be positioned horizontally. Similarly, the mist flow 402 and the first gas flow 404 can be configured at an a angle of between 0 degree and 180 degree. In the example of FIG. 4F, the mist flow 402 and the first gas flow 404 are configured at an angle of zero (0) degree and flown as co-currents to be merge into a mixed flow inside the drying chamber 310 along a horizontal path.

Referring back to FIG. 3, once the mist of the liquid mixture is dried and formed into a gas-solid mixture with the first gas, the gas-solid mixture is delivered out of the drying chamber 310 via the chamber outlet 317. The drying chamber 310 is coupled to the gas-solid separator 320 of the system 300. The gas-solid separator 320 collects chamber products (e.g., a gas-solid mixture having the first gas and dried particles of the two or more precursors mixed together) from the chamber outlet 317.

The gas-solid separator 320 includes a separator inlet 321A, two or more separator outlets 322A, 324A. The separator inlet 321A is connected to the chamber outlet 317 and adapted to collect the gas-solid mixture and other chamber products from the drying chamber 310. The gas-solid separator 320 separates the gas-solid mixture from the drying chamber 310 into a first type of solid particles and waste products. The separator outlet 322A is adapted to deliver the first type of solid particles to the reactor 340 for further processing and reactions. The separator outlet 324A is adapted to deliver waste products out of the gas-solid separator 320.

The waste products may be delivered into a gas abatement device 326A to be treated and released out of the system 300. The waste product may include, for example, water ($H_2O$) vapor, organic solvent vapor, nitrogen-containing gas, oxygen-containing gas, $O_2$, $O_3$, nitrogen gas ($N_2$), NO, $NO_2$, $NO_2$, $N_2O$, $N_4O$, $NO_3$, $N_2O_3$, $N_2O_4$, $N_2O_5$, $N(NO_2)_3$, carbon-containing gas, carbon dioxide ($CO_2$), CO, hydrogen-containing gas, $H_2$, chlorine-containing gas, $Cl_2$, sulfur-containing gas, $SO_2$, small particles of the first type of solid particles, small particles of the second type of solid particles, and combinations thereof.

The first type of solid particles may include at least particles of the two or more precursors that are dried and uniformly mixed together. It is contemplated to separate the first type of solid particles away from any side products, gaseous products or waste products, prior to reacting the two or more precursors in the reactor 340. Accordingly, the system 300 is designed to mix the two or more precursors uniformly, dry the two or more precursors, separate the dried two or more precursors, and react the two or more precursors into final reaction products in a continuous manner.

Figure 5A:
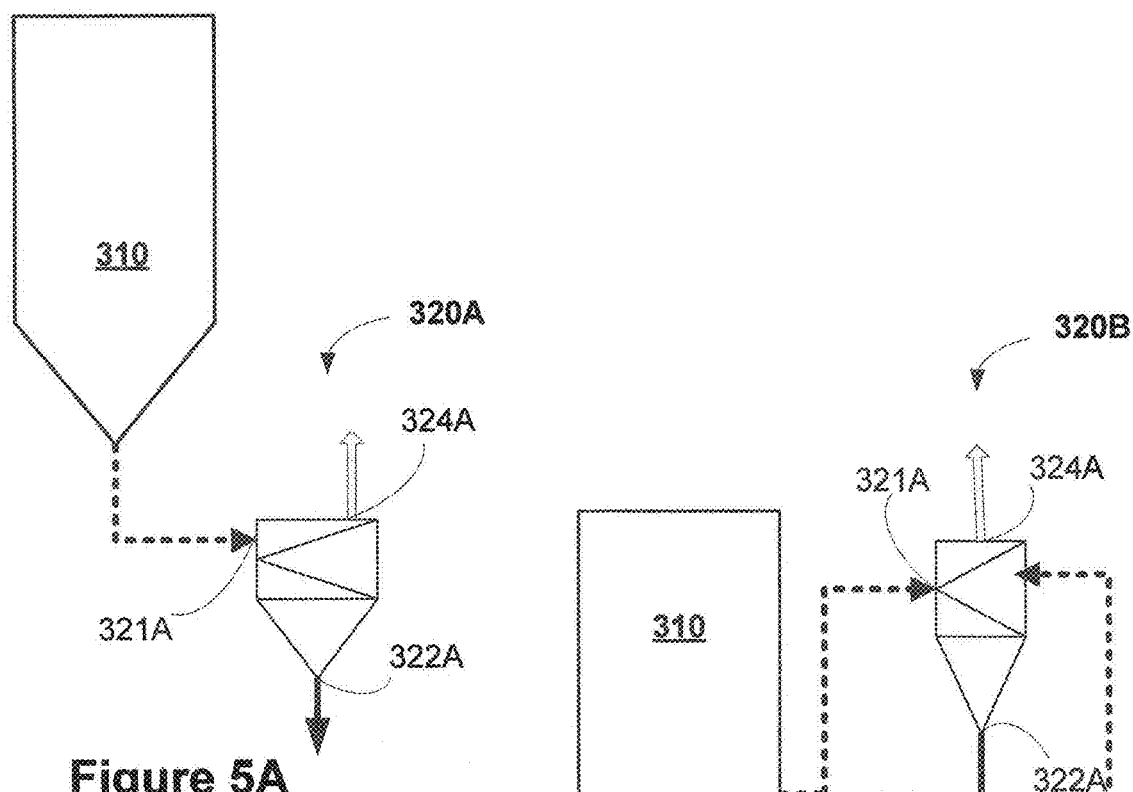
FIGS. 5A-5C show schematics of exemplary gas-solid separators connected to a drying chamber of a process system useful in preparing a material of a battery cell according various embodiments of the invention.
Figure 5B:
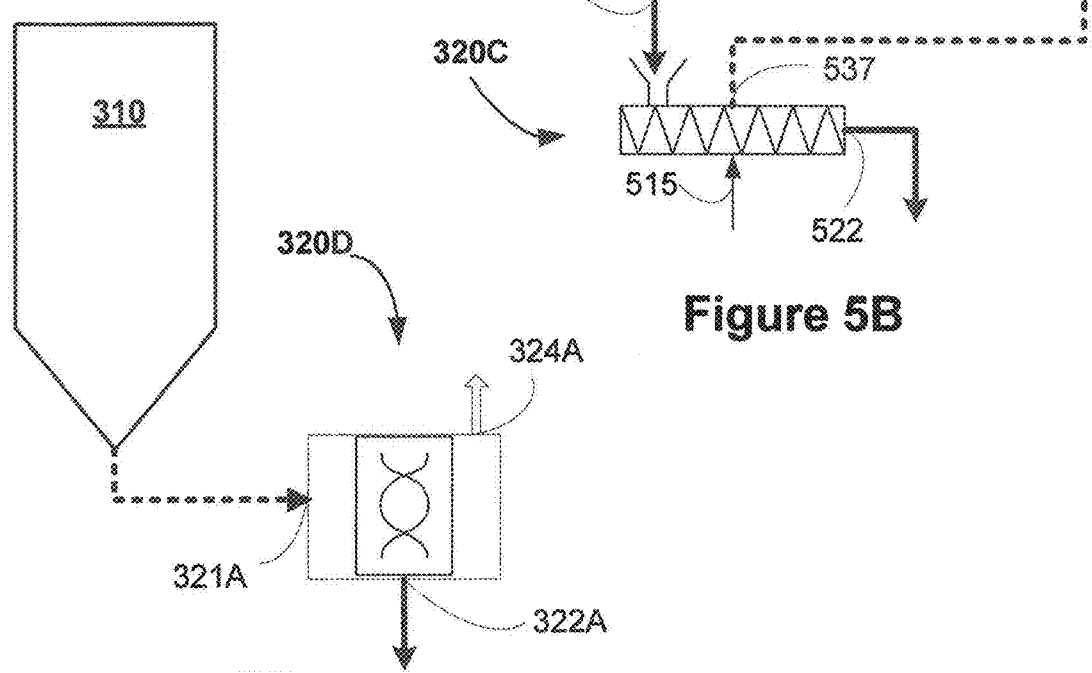
Figure 5C:
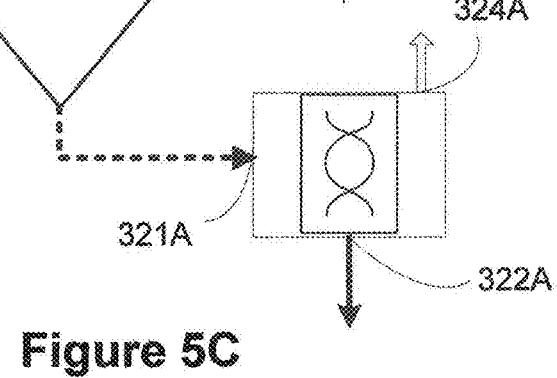

Suitable gas-solid separators include cyclones, electrostatic separators, electrostatic precipitators, gravity separators, inertia separators, membrane separators, fluidized beds, classifiers, electric sieves, impactors, particles collectors, leaching separators, elutriators, air classifiers, leaching classifiers, and combinations thereof, among others. FIGS. 5A-5C show examples of gas-solid separators 320A, 320B, 320C, 320D, being connected to the drying chamber 310 of the process system according various embodiments of the invention.

In the example of FIG. 5A, the gas-solid separator 320A is a cyclone particle collector. The gas-solid separator 320A collects the gas-solid mixture from the drying chamber 310 via the separator inlet 321A and separates the gas-solid mixture, through high speed rotational flow, gravity, and other air flows, within its cylindrical and/or conical body. Air flows in a helical pattern, beginning at the top (wide end) of the gas-solid separator 320A and ending at the bottom (narrow) end before exiting the gas-solid separator 320A in a straight stream through the center of the cyclone and out the top via the separator outlet 324A. Larger (denser) particles in a rotating stream may strike the outside wall of the gas-solid separator 320A and then fall to the bottom of the gas-solid separator 320A to be removed via the separator outlet 322A. In a conical portion of the gas-solid separator gas-solid separator 320A, as the rotating flow moves towards the narrow end of the gas-solid separator 320A, the rotational radius of the flow of the gas-solid mixture is reduced, thus being able to separate smaller and smaller particles. Usually, the geometry, together with air flow rate inside the gas-solid separator 320A defines the particle cut point size of the gas-solid separator 320A.

In the example of FIG. 5B, the gas-solid separator 320B is a cyclone particle collector. The gas-solid separator 320B is optionally used to ensure the gas-solid mixture from the drying chamber 310 is separated into specific particle cut point size, to be circulated back into the drying chamber 310 via the separator outlet 322A. Chamber products from the drying chamber 310 are delivered from a chamber outlet 519 into the gas-solid separator 320C. The gas-solid separator 320C may be, for example, a fluidized bed particle collector, for carrying out drying and/or multi-phase chemical reactions. A gas is flown from a gas line 515 through a distributor plate within the gas-solid separator 320C to distribute and fill the gas-solid separator 320C. The fluid flown from the gas line 515 is passed, at high enough velocities, through the gas-solid separator 320C full of a granular solid material (e.g., the chamber products, gas-solid mixture, and other particles delivered from the drying chamber 310) to suspend the solid material and cause it to behave as though it were a fluid, a process known as fluidization. Solid particles supported above the distributor plate can mix well and be separated from gas, liquid or other waste products, which are delivered out of the gas-solid separator 320C via a gas outlet 537. Solid particles of the two or more precursors that are dried and uniformly mixed together are delivered out of the gas-solid separator 320C via a separator outlet 522.

In the example of FIG. 5C, the gas-solid separator 320D is an electrostatic precipitating (ESP) particle collector. The gas-solid separator 320D collect the gas-solid mixture or chamber products from the drying chamber 310 and removes solid particles from a flowing gas (such as air) using the force of an induced electrostatic charge with minimal impedance for the flow of gases through the device, an ESP particle collector applies energy only to the particles being collected (not to any gases or liquids) and therefore is very efficient in energy consumption. After separation through the gas-solid separator 320D, the first type of solid particles are delivered out via the separator outlet 322A and the waste products are flown out via the separator outlet 324A.

Referring back to FIG. 3, once the first type of solid particles are separated and obtained, it is delivered into the reactor 340 for further reaction. The reactor 340 includes a gas inlet 333, a reactor inlet 345, and a reactor outlet 347. The reactor inlet 345 is connected to the separator outlet 322A and adapted to receive the first type of solid particles. Optionally, a vessel 325 is adapted to store the first type of solid particles prior to adjusting the amounts of the first type of solid particles delivered into the reactor 340.

The gas inlet 333 of the reactor 340 is coupled to a heating mechanism 380 to heat a second gas from a gas source 334 to a reaction temperature of between 400° C. and 1300° C. The heating mechanism 380 can be, for example, an electric heater, a gas-fueled heater, a burner, among other heaters. Additional gas lines can be used to deliver heated air or gas into the reactor 340, if needed. The pre-heated second gas can fill the reactor 340 and maintained the internal temperature of the reactor 340, much better and energy efficient than conventional heating of the chamber body of a reactor.

The second gas flown inside the reactor 340 is designed to be mixed with the first type of solid particles and form a second gas-solid mixture inside the reactor 340. Thermal energy from the pre-heated second gas is used as the energy source for reacting the second gas-solid mixture within the reactor 340 for a residence time of between 1 second and ten hours, or longer, depending on the reaction temperature and the type of the precursors initially delivered into the system 300. The second gas-solid mixture is then go through one or more reactions, including, but not limited to, oxidation, reduction, decomposition, combination reaction, phase-transformation, re-crystallization, single displacement reaction, double displacement reaction, combustion, isomerization, and combinations thereof. One embodiment of the invention provides the control of the temperature of the reactor 340 by the temperature of the heated second gas. The use of the heated second gas as the energy source inside the reactor 340 provides the benefits of fast heat transfer, precise temperature control, uniform temperature distribution therein, and/or easy to scale up, among others.

Once the reactions inside the reactor 340 are complete, for example, upon the formation of desired crystal structure, particle morphology, and particle size, reaction products are delivered out of the reactor 340 via the reactor outlet 347 and/or a reactor outlet 618 and cooled down. The cooled reaction products include a second type of solid particles containing, for example, oxidized reaction product particles of the precursor compounds which are suitable as a material of a battery cell.

Optionally, the system 300 includes a second gas-solid separator, such as a gas-solid separator 328, which collects the reaction products from the reactor outlet 347 of the reactor 340. The gas-solid separator 328 may be a particle collector, such as cyclone, electrostatic separator, electrostatic precipitator, gravity separator, inertia separator, membrane separator, fluidized beds classifiers electric sieves impactor, leaching separator, elutriator, air classifier, leaching classifier, and combinations thereof. Suitable examples of the gas-solid separator 328 include the exemplary gas-solid separators as shown in FIGS. 5A-5C.

The gas-solid separator 328 of the system 300 generally includes a separator inlet 321B, a separator outlet 322B and a separator outlet 324B and is used to separate the reaction products into the second type of solid particles and gaseous side products. The gaseous side products may be delivered into a gas abatement device 326B to be treated and released out of the system 300. The gaseous side products separated by the gas-solid separator 328 may generally contain water ($H_2O$) vapor, organic solvent vapor, nitrogen-containing gas, oxygen-containing gas, $O_2$, $O_3$, nitrogen gas ($N_2$), NO, $NO_2$, $NO_2$, $N_2O$, $N_4O$, $NO_3$, $N_2O_3$, $N_2O_4$, $N_2O_5$, $N(NO_2)_3$, carbon-containing gas, carbon dioxide ($CO_2$), CO, hydrogen-containing gas, $H_2$, chlorine-containing gas, $Cl_2$, sulfur-containing gas, $SO_2$, small particles of the first type of solid particles, small particles of the second type of solid particles, and combinations thereof.

In addition, the system 300 may further include one or more cooling fluid lines 353, 355 connected to the reactor outlet 347 or the separator outlet 322A of the gas solid separator 328 and adapted to cool the reaction products and/or the second type of solid particles. The cooling fluid line 353 is adapted to deliver a cooling fluid (e.g., a gas or liquid) from a source 352 to the separator inlet 321B of the gas-solid separator 328. The cooling fluid line 355 is adapted to deliver a cooling fluid, which may filtered by a filter 354 to remove particles, into a heat exchanger 350.

The heat exchanger 350 is adapted to collect and cool the second type of solid particles and/or reaction products from the gas-solid separator 328 and/or the reactor 340 by flowing a cooling fluid through them. The cooling fluid has a temperature lower than the temperature of the reaction products and the second type of solid particles delivered from the gas-solid separator 328 and/or the reactor 340. The cooling fluid may have a temperature of between 4° C. and 30° C. The cooling fluid may be liquid water, liquid nitrogen, an air, an inert gas or any other gas which would not react to the reaction products.

FIGS. 6A-6D illustrates examples of reactors 340A, 340B, 340C, 340D which can be used in the process 200 and the system 300 for preparing a material of a battery cell. In general, the reactor 340 of the system 300 can be a fluidized bed reactor, such as a circulating fluidized bed reactor, a bubbling fluidized bed reactor, an annular fluidized bed reactor, a flash fluidized bed reactor, and combinations thereof. In addition, the reactor 340 can be any of a furnace-type reactor, such as a rotary furnace, a stirring furnace, a furnace with multiple temperature zones, and combinations thereof.

Figure 6A:
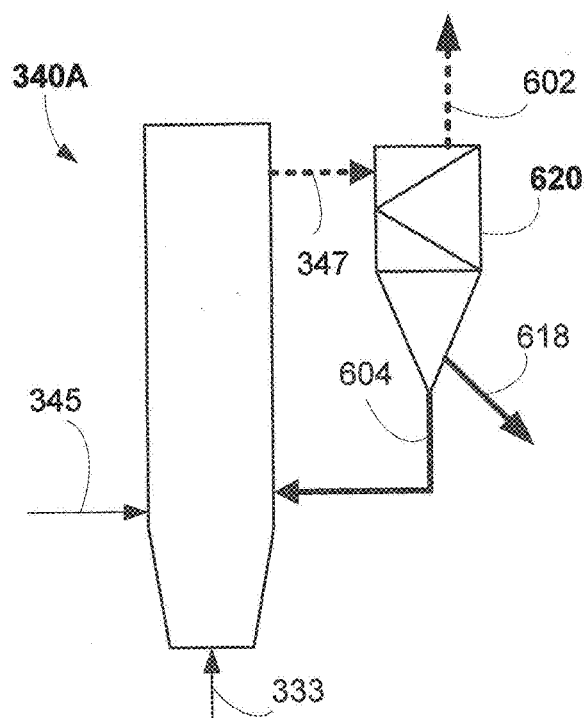
FIGS. 6A-6D show schematics of exemplary reactors useful in a process system of FIG. 3 for preparing a material of a battery cell according various embodiments of the invention.

In the example of FIG. 6A, the reactor 340A is a circulating-type fluidized bed reactor. The reactor 340A receives the first type of solid particles from the reactor inlet 345 and mixes it with a flow of pre-heated second gas from the gas line 333 to form a gas-solid mixture within the internal volume of the reactor 340A. The gas-solid mixture is heated by the thermal energy of the preheated second gas and complete reaction is enhanced by continuously flowing the gas-solid mixture out of the reactor 340A into a gas-solid separator 620 coupled to the reactor 340A. The gas-solid separator 620 is provided to remove side products (and/or a portion of reaction products) out of the system 300 via a separator outlet 602 and recirculating solid particles back into the reactor 340A via a separator outlet 604. Product particles with desired sizes, crystal structures, and morphology are collected and delivered out of the gas-solid separator 620 via a separator outlet 618 (and/or the separator outlet 602).

Figure 6B:
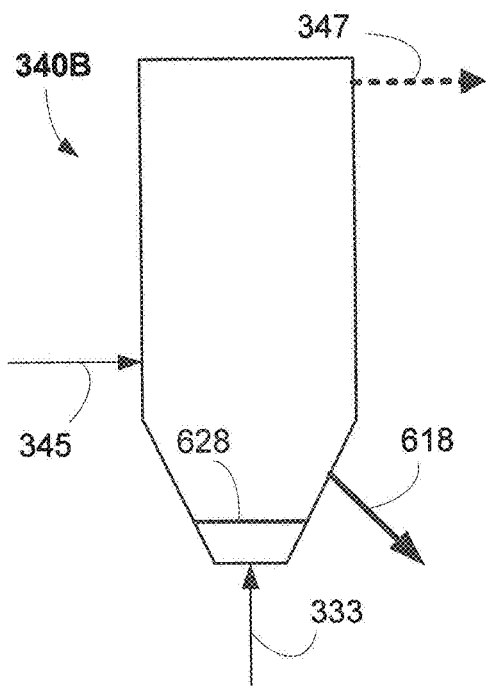

In the example of FIG. 6B, the reactor 340B is a bubbling-type fluidized bed reactor. A flow of pre-heated second gas from the gas line 333 is delivered into the reactor 340B and passes through a porous medium 628 to mix with the first type of solid particles delivered from the reactor inlet 345 and generate a bubbling gaseous fluid-solid mixture within the internal volume of the reactor 340B. The bubbling gas-solid mixture is heated by the thermal energy of the preheated second gas and complete reaction is enhanced by bubbling flows within the reactor 340B. Upon complete reaction, gaseous side products are removed out of the reactor 340B via the rector outlet 347. Product particles with desired crystal structures, morphology, and sizes are collected and delivered out of the reactor 340B via the reactor outlet 618.

Figure 6C:
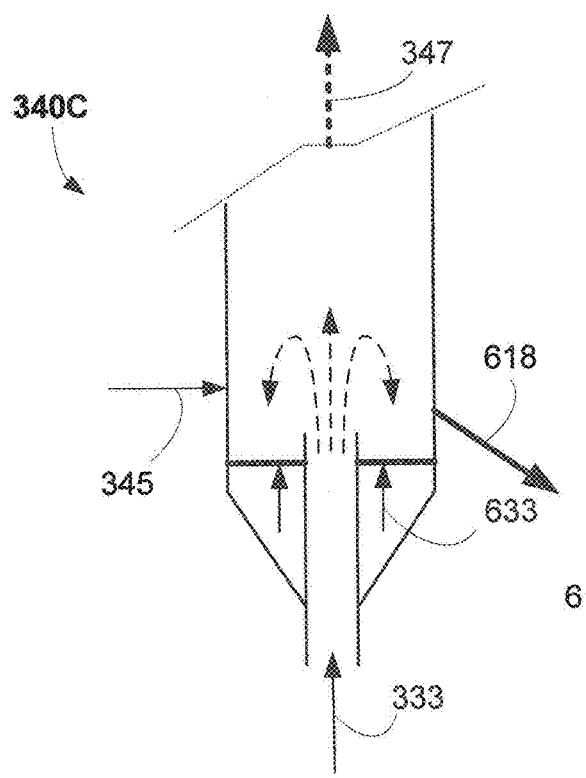

In the example of FIG. 6C, the reactor 340C is an annular-type fluidized bed reactor. A flow of pre-heated second gas from the gas line 333 is delivered into the reactor 340C and also diverted into additional gas flows, such as gas flows 633, to encourage thorough-mixing of the heated gas with the solid particles delivered from the reactor inlet 345 and generate an uniformly mixed gas-solid mixture within the internal volume of the reactor 340C. Upon complete reaction, gaseous side products are removed out of the reactor 340C via the rector outlet 347. Product particles with desired crystal structures, morphology, and sizes are collected and delivered out of the reactor 340C via the reactor outlet 618.

Figure 6D:
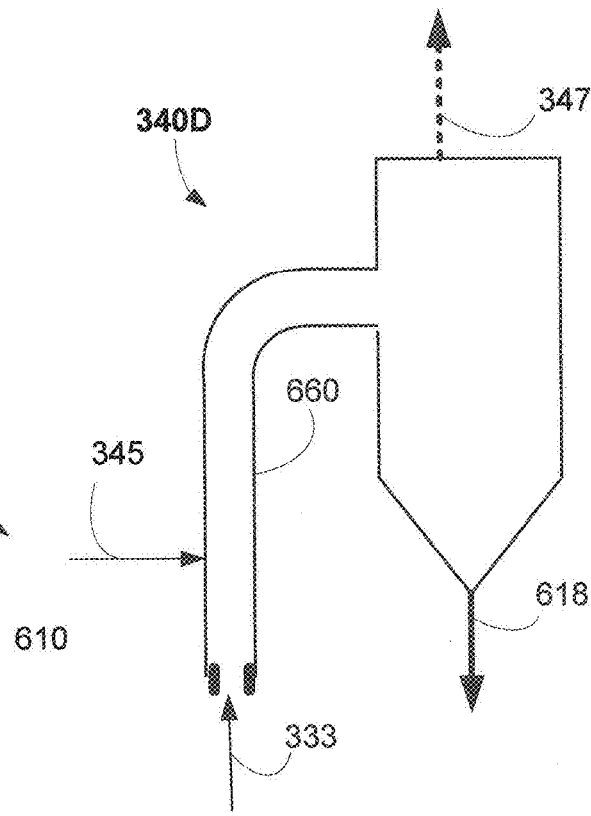

In the example of FIG. 6D, the reactor 340D is a flash-type fluidized bed reactor. The reactor 340D receives the solid particles from the reactor inlet 345 and mixes it with a flow of pre-heated gas from the gas line 333 to form a gas-solid mixture. The gas-solid mixture is passed through a tube reactor body 660 which is coupled to the reactor 340D. The gas-solid mixture has to go through the long internal path, which encourages complete reaction using the thermal energy of the heated gas. Gaseous side products are then removed out of the reactor 340D via the rector outlet 347, and product particles with desired crystal structures, morphology, and sizes are collected and delivered out of the reactor 340D via the reactor outlet 618. It is noted that additional gas lines can be used to deliver heating or cooling air or gas into the reactors 340A, 340B, 340C, 340D.

Referring back to FIG. 3, final reaction products are collected and cooled by one or more separators, cooling fluid lines, and/or heat exchangers, and once cooled, the second type of solid particles are delivered out of the system 300 and collected in a final product collector 368. The second type of solid particles may include oxidized form of precursors, such as an oxide material, suitable to be packed into a battery cell 370. Additional pumps may also be installed to achieve the desired pressure gradient.

A process control system 390 can be coupled to the system 300 at various locations to automatically control the manufacturing process performed by the system 300 and adjust various process parameters (e.g., flow rate, mixture ratio, temperature, residence time, etc.) within the system 300. For example, the flow rate of the liquid mixture into the system 300 can be adjusted near the reactant sources 302A, 302B, the liquid mixer 304, or the pump 305. As another example, the droplet size and generation rate of the mist generated by the mist generator 306 can be adjusted. In addition, flow rate and temperature of various gases flown within the gas lines 331A, 331B, 331C, 331D, 333, 353, 355, 515, etc., can be controlled by the process control system 390. In addition, the process control system 390 is adapted to control the temperature and the residence time of various gas-solid mixture and solid particles at desired level at various locations.

Accordingly, a continuous process for producing a material of a battery cell using a system having a mist generator, a drying chamber, one or more gas-solid separators and a reactor is provided. A mist generated from a liquid mixture of two or more metal precursor compounds in desired ratio is mixed with air and dried inside the drying chamber, thereby forming gas-solid mixtures. One or more gas-solid separators are used in the system to separate the gas-solid mixtures from the drying chamber into solid particles packed with the two or more metal precursors and continuously deliver the solid particles into the reactor for further reaction to obtain final solid material particles with desired ratio of two or more intercalated metals.

In one embodiment, preparation and manufacturing of a metal oxide material is provided. Depending on the details and ratios of the metal precursor compounds that are delivered into the system 300, the resulting final solid material particles obtained from the system 300 may be a metal oxide material, a doped metal oxide material, an inorganic metal salts, among others. Exemplary metal oxide materials include, but are not limited to, titanium oxide ($Ti_xO_y$, such as $Ti_2O_5$), chromium oxide ($Cr_xO_y$, such as $Cr_2O_7$), tin oxide ($Sn_xO_y$, such as $SnO_2$, $SnO$, $SnSiO_3$, etc.), copper oxide ($Cu_xO_y$, such as $CuO$, $Cu_2O$, etc), aluminum oxide ($Al_xO_y$, such as $Al_2O_3$,), manganese oxide ($Mn_xO_y$), iron oxide ($Fe_xO_y$, such as $Fe_2O_3$, etc), among others.

For mixed metal oxide materials, it is desired to control the composition of a final reaction product material by the ratio of the precursor compounds added in a liquid mixture added to the system 300. In one embodiment, a metal oxide with two or more metals ($Me_xMe'_yO_z$) is obtained. Examples include lithium transitional metal oxide ($LiMeO_2$), lithium titanium oxide (e.g., $Li_4Ti_5O_{12}$), lithium cobalt oxide (e.g., $LiCoO_2$), lithium manganese oxide (e.g., $LiMn_2O_4$), lithium nickel oxide (e.g., $LiNiO_2$), lithium iron phosphate (e.g., $LiFePO_4$), lithium cobalt phosphate (e.g., $LiCoPO_4$), lithium manganese phosphate (e.g., $LiMnPO_4$), lithium nickel phosphate (e.g., $LiNiPO_4$), sodium iron oxide (e.g., $NaFe_2O_3$), sodium iron phosphate (e.g., $NaFeP_2O_7$), among others.

In another example, a metal oxide with three or four intercalated metals is obtained. Exemplary metal oxide materials include, but are not limited to, lithium nickel cobalt oxide (e.g., $Li_xNi_yCo_zO_2$), lithium nickel manganese oxide (e.g., $Li_xNi_yMn_zO_2$, $Li_xNi_yMn_zO_4$, etc.), lithium nickel manganese cobalt oxide (e.g., $Li_aNi_bMn_cCo_dO_e$ in layered structures or layered-layered structures; and/or $LiNi_xMn_yCo_zO_2$, a NMC oxide material where x+y+z=1, such as $LiNi_{0.33}Mn_{0.33}Co_{0.33}O_2$, $LiNi_{0.6}Mn_{0.2}Co_{0.2}O_2$, $LiNi_{0.5}Mn_{0.3}Co_{0.2}O_2$, $LiNi_{0.4}Mn_{0.4}Co_{0.2}O_2$, $LiNi_{0.7}Mn_{0.15}Co_{0.15}O_2$, $LiNi_{0.8}Mn_{0.1}Co_{0.1}O_2$, etc.; and/or a mixed metal oxide with doped metal, among others. Other examples include lithium cobalt aluminum oxide (e.g., $Li_xCo_yAl_zO_n$), lithium nickel cobalt aluminum oxide (e.g., $Li_xNi_yCo_zAl_aO_b$), sodium iron manganese oxide (e.g., $Na_xFe_yMn_zO_2$), among others. In another example, a mixed metal oxide with doped metal is obtained; for example. $Li_a(Ni_xMn_yCo_z)MeO_b$ (where Me=doped metal of Al, Mg, Fe, Ti, Cr, Zr, or C), $Li_a(Ni_xMn_yCo_z)MeO_bF_c$ (where Me=doped metal of Al, Mg, Fe, Ti, Cr, Zr, or C), among others.

Other metal oxide materials containing one or more lithium (Li), nickel (Ni), manganese (Mn), cobalt (Co), aluminum (Al), titanium (Ti), sodium (Na), potassium (K), rubidium (Rb), vanadium (V), cesium (Cs), copper (Cu), magnesium (Mg), iron (Fe), among others, can also be obtained. In addition, the metal oxide materials can exhibit a crystal structure of metals in the shape of layered, spinel, olivine, etc. In addition, the morphology of the final reaction particles (such as the second type of solid particles prepared using the method 100 and the system 300 as described herein) exists as desired solid powders. The particle sizes of the solid powders range between 10 nm and 100 um.

While the foregoing is directed to embodiments of the present invention, other and further embodiments of the invention may be devised without departing from the basic scope thereof, and the scope thereof is determined by the claims that follow.

What is claimed:

1. A method of producing a material for a battery electrochemical cell, comprising:
    forming a liquid mixture;
    generating a mist of the liquid mixture at desired liquid droplet sizes;
    flowing a flow of a first gas heated to a first temperature into a reaction chamber;
    forming a first gas-solid mixture from the mist and the flow of the first gas;
    drying the first gas-solid mixture for a first residence time inside the reaction chamber;
    flowing a flow of a second gas heated to a second temperature into the reaction chamber, wherein the second temperature is higher than the first temperature;
    forming a second gas-solid mixture inside the reaction chamber;
    reacting the second gas-solid mixture inside the reaction chamber for a second residence time and oxidizing the second gas-solid mixture into an oxidized reaction product;
    delivering the oxidized reaction product out of the reaction chamber; and
    cooling the oxidized reaction product and obtaining solid particles of the oxidized reaction product as the material for the battery electrochemical cell.

2. The method of claim 1, further comprising:
    separating the oxidized reaction product into a type of solid particles and a gaseous side product.

3. The method of claim 2, further comprising:
    flowing one or more flows of a cooling fluid to cool the temperature of the solid particles.

4. The method of claim 1, wherein the solid particles comprises an oxide compound with two or more metals.

5. The method of claim 1, wherein the liquid mixture comprises two or more metal-containing precursors selected from the group consisting of metal salts, lithium-containing compound, cobalt-containing compound, manganese-containing compound, nickel-containing compound, lithium sulfate ($Li_2SO_4$), lithium nitrate ($LiNO_3$), lithium carbonate ($Li_2CO_3$), lithium acetate ($LiCH_2COO$), lithium hydroxide (LiOH), lithium formate ($LiCHO_2$), lithium chloride (LiCl), cobalt sulfate ($CoSO_4$), cobalt nitrate ($Co(NO_3)_2$), cobalt carbonate ($CoCO_3$), cobalt acetate ($Co(CH_2COO)_2$), cobalt hydroxide ($Co(OH)_2$), cobalt formate ($Co(CHO_2)_2$), cobalt chloride ($CoCl_2$), manganese sulfate ($MnSO_4$), manganese nitrate ($Mn(NO_3)_2$), manganese carbonate ($MnCO_3$), manganese acetate ($Mn(CH_2COO)_2$), manganese hydroxide ($Mn(OH)_2$), manganese formate ($Mn(CHO_2)_2$), manganese chloride ($MnCl_2$), nickel sulfate ($NiSO_4$), nickel nitrate ($Ni(NO_3)_2$), nickel carbonate ($NiCO_3$), nickel acetate ($Ni(CH_2COO)_2$), nickel hydroxide ($Ni(OH)_2$), nickel formate ($Ni(CHO_2)_2$), nickel chloride ($NiCl_2$), aluminum (Al)-containing compound, titanium (Ti)-containing compound, sodium (Na)-containing compound, potassium (K)-containing compound, rubidium (Rb)-containing compound, vanadium (V)-containing compound, cesium (Cs)-containing compound, chromium (Cr)-containing compound, copper (Cu)-containing compound, magnesium (Mg)-containing compound, iron (Fe)-containing compound, and combinations thereof.

6. The method of claim 1, wherein the first gas comprises a gas selected from the group consisting of air, oxygen, carbon dioxide, nitrogen gas, inert gas, noble gas, and combinations thereof.

7. The method of claim 1, wherein the flow of the first gas and the flow of the mist of the liquid mixture are flown inside the drying chamber at an angle of 0 degree to 180 degrees.

8. The method of claim 1, wherein the first gas is heated to the first temperature of between 70° C. and 600° C.

9. The method of claim 1, wherein the second gas comprises a gas selected from the group consisting of air, oxygen, carbon dioxide, an oxidizing gas, nitrogen gas, inert gas, noble gas, and combinations thereof.

10. The method of claim 1, wherein the second gas is heated to the second temperature of between 400° C. and 1300° C.

11. The method of claim 1, Wherein the first residence time is between one second and one hour, and the second residence time is between one second and ten hours.

12. The method of claim 1, wherein the mist is generated at desired liquid droplet sizes of between one tenth of a micron and one millimeter.

13. The method of claim 1, wherein the reaction chamber is selected from the group consisting of a furnace, a rotary furnace, a stirring furnace, a furnace with multiple temperature zones, a drying chamber, a vertical chamber, a horizontal chamber, a fluidized bed reactor, a circulating fluidized bed reactor, a bubbling fluidized bed reactor, an annular fluidized bed reactor, a flash fluidized bed reactor, and combinations thereof.

14. The method of claim 1, wherein the liquid mixture comprises two or more metal-containing precursors selected from the group consisting of metal salts, lithium-containing compound, cobalt-containing compound, manganese-containing compound, nickel-containing compound, lithium sulfate ($Li_2SO_4$), lithium nitrate ($LiNO_3$), lithium carbonate ($Li_2CO_3$), lithium acetate ($LiCH_2COO$), lithium hydroxide (LiOH), lithium formate ($LiCHO_2$), lithium chloride (LiCl), cobalt sulfate ($CoSO_4$), cobalt nitrate ($Co(NO_3)_2$), cobalt carbonate ($CoCO_3$), cobalt acetate ($Co(CH_2COO)_2$), cobalt hydroxide ($Co(OH)_2$), cobalt formate ($Co(CHO_2)_2$), cobalt chloride ($CoCl_2$), manganese sulfate ($MnSO_4$), manganese nitrate ($Mn(NO_3)_2$), manganese carbonate ($MnCO_3$), manganese acetate ($Mn(CH_2COO)_2$), manganese hydroxide ($Mn(OH)_2$), manganese formate ($Mn(CHO_2)_2$), manganese chloride ($MnCl_2$), nickel sulfate ($NiSO_4$), nickel nitrate ($Ni(NO_3)_2$), nickel carbonate ($NiCO_3$), nickel acetate ($Ni(CH_2COO)_2$), nickel hydroxide ($Ni(OH)_2$), nickel formate ($Ni(CHO_2)_2$), nickel chloride ($NiCl_2$), aluminum (Al)-containing compound, titanium (Ti)-containing compound, sodium (Na)-containing compound, potassium (K)-containing compound, rubidium (Rb)-containing compound, vanadium (V)-containing compound, cesium (Cs)-containing compound, chromium (Cr)-containing compound, copper (Cu)-containing compound, magnesium (Mg)-containing compound, iron (Fe)-containing compound, and combinations thereof.

15. The method of claim 1, wherein the first gas comprises a gas selected from the group consisting of air, oxygen, carbon dioxide, nitrogen, and the second gas comprises a gas selected from the group consisting of air, oxygen, carbon dioxide, an oxidizing gas, nitrogen gas, inert gas, noble gas, and combinations thereof gas, inert gas, noble gas, and combinations thereof.

16. The method of claim 1, wherein the first gas is heated to the first temperature of between 70° C. and 600° C., and the second gas is heated to the second temperature of between 400° C. and 1300° C.

17. The method of claim 1, wherein the reaction chamber of the process system comprises a reactor selected from the group consisting of a furnace, a rotary furnace, a stirring furnace, a furnace with multiple temperature zones, a drying chamber, a vertical chamber, a horizontal chamber, a fluidized bed reactor, a circulating fluidized bed reactor, a bubbling fluidized bed reactor, an annular fluidized bed reactor, a flash fluidized bed reactor, and combinations thereof.

18. A method of preparing a material for a battery electrochemical cell, comprising:
    forming a liquid mixture from two or more metal-containing precursors;
    delivering the liquid mixture into a process system comprising a mist generator and a reaction chamber;
    generating a mist of the liquid mixture at desired liquid droplet sizes using the mist generator of the process system;
    flowing a flow of a first gas heated to a first temperature into the process system;
    forming a first gas-solid mixture from the mist and the flow of the first gas;
    drying the first gas-solid mixture for a first residence time inside the process system;
    flowing a flow of a second gas heated to a second temperature into the process system, wherein the second temperature is higher than the first temperature;
    forming a second gas-solid mixture inside the process system;
    reacting the second gas-solid mixture inside the process system for a second residence time and oxidizing the second gas-solid mixture into an oxidized reaction product;
    delivering the oxidized reaction product out of the process system; and
    cooling the oxidized reaction product and obtaining solid particles of the oxidized reaction product as the material for the battery electrochemical cell.

19. The method of claim 18, further comprising:
    separating the oxidized reaction product into solid particles and a gaseous side product.

20. A method of preparing a material for a battery electrochemical cell, comprising:
    forming a liquid mixture from two or more metal-containing precursors;
    delivering the liquid mixture into a process system;
    generating a mist of the liquid mixture at desired liquid droplet sizes using the mist generator of the process system;
    flowing a flow of a first gas heated to a first temperature into the process system;
    forming a first gas-solid mixture from the mist and the flow of the first gas;
    drying the first gas-solid mixture for a first residence time inside the process system;
    flowing a flow of a second gas heated to a second temperature into the process system, wherein the second temperature is higher than the first temperature;
    forming a second gas-solid mixture inside the process system;
    reacting the second gas-solid mixture inside the process system for a second residence time and oxidizing the second gas-solid mixture into an oxidized reaction product;
    delivering the oxidized reaction product out of the process system;
    separating the oxidized reaction product into solid particles and a gaseous side product; and
    cooling the solid particles of the oxidized reaction product and obtaining the solid particles as the material for the battery electrochemical cell.

* * * * *